United States Patent
Alva et al.

(10) Patent No.: US 12,016,360 B2
(45) Date of Patent: Jun. 25, 2024

(54) METHODS AND APPARATUSES FOR TEMPERING ORGANIC PRODUCTS

(71) Applicants: Junia Suresh Alva, Mumbai (IN); Vernon Rainer Alva, Mumbai (IN)

(72) Inventors: Junia Suresh Alva, Mumbai (IN); Vernon Rainer Alva, Mumbai (IN)

( * ) Notice: Subject to any disclaimer, the term of this patent is extended or adjusted under 35 U.S.C. 154(b) by 575 days.

(21) Appl. No.: 17/151,691

(22) Filed: Jan. 19, 2021

(65) Prior Publication Data

US 2021/0251261 A1    Aug. 19, 2021

Related U.S. Application Data

(63) Continuation-in-part of application No. PCT/IN2019/050088, filed on Feb. 5, 2019.

(30) Foreign Application Priority Data

Jan. 22, 2019  (IN) .............................. 201921002693

(51) Int. Cl.
  *A23L 3/37*   (2006.01)
  *A23L 3/3463*  (2006.01)
  *A23L 3/3589*  (2006.01)

(52) U.S. Cl.
  CPC .............. *A23L 3/37* (2013.01); *A23L 3/3463* (2013.01); *A23L 3/3589* (2013.01)

(58) Field of Classification Search
  None
  See application file for complete search history.

(56) References Cited

U.S. PATENT DOCUMENTS

| | | | | |
|---|---|---|---|---|
| 3,440,831 A | * | 4/1969 | Thompson | F25D 9/005 62/63 |
| 2013/0323386 A1 | | 12/2013 | Luketic et al. | |

FOREIGN PATENT DOCUMENTS

| | | |
|---|---|---|
| GB | 2044906 A | 10/1983 |
| JP | 40190737 A | 7/1992 |

OTHER PUBLICATIONS

International Search Report (03 pages) and Written Opinon (05 pages) received for PCT Application No. PCT/IN2019/050088, dated Jul. 26, 2019.

* cited by examiner

*Primary Examiner* — Donald R Spamer
*Assistant Examiner* — Lela S. Davis
(74) *Attorney, Agent, or Firm* — Scott D. Swanson; Shaver Swanson

(57) ABSTRACT

The invention relates to a method and apparatus of tempering an organic product in an enclosed structure using a liquid maintained at a predefined temperature. The method includes, introducing the organic product through at least one access means of the enclosed structure into the liquid, circulating the liquid from the enclosed structure through a heating unit and back into the enclosed structure to increase a temperature of the liquid up to a predefined temperature, and supplying a gaseous substance into the enclosed structure for a predefined time period based on a temperature of the liquid in the enclosed structure. The organic product is removed through the access means of the enclosed structure when a core temperature of the organic product reaches the predefined temperature.

11 Claims, 8 Drawing Sheets

METHODS AND APPARATUSES FOR TEMPERING ORGANIC PRODUCTS

RELATED APPLICATION

The instant application is related to granted Indian Patent No: 334986, titled, "METHODS AND APPARATUSES FOR TEMPERING ORGANIC PRODUCTS" and co-pending PCT Application No. PCT/IN2019/050088, inventors Junia Suresh Alva and Vernon Rainer Alva, Filed: On 22 Jan. 2019 which is incorporated in its entirety herewith.

BACKGROUND OF THE INVENTION

Field of the Invention

The present invention relates generally to defrosting of organic products. More particularly the present invention relates to methods and apparatuses for tempering organic products subsequent to freezing.

Description of Related Art

Organic products (e.g. food products) are usually preserved by freezing over extended periods of time. Frozen organic products need to be thawed or tempered prior to consumption or utilization. For example, a food product at a frozen temperature (e.g. below −18 degree Celsius) is thawed to fresh chilled temperatures (e.g. 0 to 4 degree Celsius) prior to cooking or heating the food for consumption. Current techniques of thawing frozen organic products are known to result in deterioration of quality of the organic products.

For example, some existing techniques of thawing includes immersing the organic products in liquids at a room temperature, running water over the frozen products, and exposing the organic products to warm air. Another technique of thawing includes exposing the organic products to microwave radiation in a microwave oven. Aforementioned techniques of thawing tend to promote growth of bacteria, germs and microbes (that exist in an inactive state in the frozen products) due to the high temperatures involved. Further, thawing at high temperatures, results in deterioration of biological and physiochemical properties of the products.

For example, chicken meat thawed at high temperatures undergoes tissue tearing and shortening of muscle tissues. Further, microwaving results in dehydration, hot spots, and uneven cooking of portions of the organic product. Furthermore, products thawed at high temperatures cannot be refrozen, and hence either need to be utilized completely post thawing or discarded if not required.

As thawing at high temperatures promotes unwanted microbial growth, food safety organizations usually recommend tempering of food products at refrigeration temperatures (e.g. −5 to 0 degree Celsius) to prevent the growth microbes and pathogens. Existing prior art methods of tempering at low temperatures, include tempering/thawing in a refrigerator for long periods of time, passing of cold air or circulating liquids at a low temperature within a sealed chamber for long periods of time or immersing the organic products in liquid mediums maintained at low temperatures. However, such methods are known to prolong the process of thawing. Prolonged periods of thawing lead to deterioration in the quality of the products. Further, long periods of thawing fail to meet an immediate need or demand or requirement of organic products.

To overcome the drawbacks as aforementioned, there is a need for an improved method and apparatus for tempering organic products. The improved method must thaw organic products at low temperatures in a relatively short span of time. Further, the improved method and apparatus should ensure good quality of the organic products upon tempering. Accordingly, an alternate method and apparatus for tempering organic products is disclosed.

BRIEF SUMMARY OF THE INVENTION

An aspect of the invention provides a method for tempering an organic product in an enclosed structure that contains a liquid maintained at a predefined temperature. The liquid is an aqueous solution of alcohol, propylene glycol, ethylene glycol, or brine. For example, the liquid is an aqueous solution of propylene glycol, where a weight ratio of propylene glycol to water is from 0.5:4 to 1.5:4. Typically, prior to tempering, the organic product is in a frozen state, and a temperature of the organic product is lower than the predefined temperature of the liquid. For example, the temperature of the organic product is in a range of −100 to −30 degree Celsius, and the predefined temperature is in a range of −5 to 0 degree Celsius. In an embodiment, the organic product includes seafood, meat, poultry, vegetables, fruits, roots, seeds, microbes, fungi, albumin, milk, proteins, gels, biological media and/or blood plasma. In an embodiment, the organic product is packed or double sealed (vacuum-sealed) in a gas permeable bag, and a high barrier bag. The gas permeable bag is a first layer of packing on the organic product, and the high barrier bag is a second layer of packing covering the gas permeable bag. The high barrier bag is a non-permeable bag. The double sealing isolates the organic product from the liquid during the tempering process, thereby protecting the organic product from any chemical reaction that can occur upon getting in contact with the liquid.

The method includes, introducing the organic product through an access means of the enclosed structure into the liquid, where the access means is opened during the introduction and is closed thereupon. In an embodiment, the access means is a closeable opening (eg. a lid or a door) provided in a top portion of the enclosed structure. In an embodiment, the organic product is placed in a meshed structure or a meshed arrangement that includes a plurality of shelves for accommodating the organic product. Further, the meshed arrangement is introduced through the access means into the enclosed structure, such that the plurality of shelves of the meshed arrangement is immersed completely into the liquid. The meshed arrangement permits flow of the liquid around the organic product. In an embodiment, the plurality of shelves is made of a plurality of meshed wires that permit flow of liquid around the organic product. In another embodiment, the plurality of shelves are perforated/or have a plurality of holes that permit the liquid to flow around the liquid.

The method includes maintaining the liquid at the predefined temperature during the process of tempering. For example, the liquid is maintained at the predefined temperature of −5 to 0 degree Celsius during the tempering process.

In order to maintain the liquid at the predefined temperature, the liquid is circulated from the enclosed structure through a heating unit and back into the enclosed structure to increase a temperature of the liquid up to the predefined temperature, wherein the heating unit to supply heat to the liquid to increase the temperature up to the predefined temperature. In an embodiment, the liquid is pumped at a first flow rate from at least one outlet of the enclosed structure through at least one liquid transmission means into a reservoir via the heating unit. In an embodiment, a pumping unit is coupled to a liquid transmission means to pump the liquid from an outlet of the enclosed structure to an inlet of the reservoir. For example, the liquid is pumped by the pumping unit from the outlet of the enclosed structure through a conduit into the reservoir through the heating unit.

The heating unit is an apparatus that supplies heat to liquid passing through it. In an embodiment, the heating unit includes a temperature control unit that controls a supply of heat to the stream of the liquid passing through the heating unit. The supply of heat is based on a difference between a temperature of the stream of the liquid and the predefined temperature. In an embodiment, the temperature control unit measures a temperature of the liquid and calculates a difference in temperature between the stream of the liquid and the predefined temperature. The amount of heat supply is proportionally dependent on the difference in temperature.

In an embodiment, the temperature control device is a thermostat that is coupled internally to the heating unit. In another embodiment, the temperature control unit is coupled externally to the liquid transmission means at the inlet of the heating unit. Upon heating the liquid, the liquid is transferred from the heating unit to at least one inlet of the reservoir through the at least one liquid transmission means. In an example, the liquid is transferred through a liquid transmission means (e.g. a conduit) to an inlet of the reservoir, where the liquid transmission means extends from an outlet of the enclosed structure through the heating unit and up to the inlet of the reservoir.

Further, liquid is pumped at a second flow rate from the reservoir to at least one inlet of the enclosed structure through at least one other liquid transmission means. In an embodiment, the liquid is pumped from an outlet of the reservoir by another pumping unit through a liquid transmission means (e.g. a pipe) to an inlet of the enclosed structure. The other pumping unit is coupled to the at least one liquid transmission means. In an embodiment, the reservoir is an enclosed chamber that stores liquid at the predefined temperature. In an embodiment, the reservoir is maintained at the predefined temperature by a plurality of condensers. Further, the first flow rate and the second flow rate are adjusted to maintain the liquid in the enclosed structure at a predetermined level. In an embodiment, a controller operates the pumping unit to pump the liquid at the first flow rate, and operates the other pumping unit to pump the liquid at the second flow rate. The controller can operate the pumping unit and the other pumping unit via communication links (e.g. wireless communication links). Further, the controller can also operate opening and closing of valves provided in the at least one inlet and the at least one outlet of the enclosed structure, and the at least one inlet and the at least one outlet of the reservoir.

The method further includes, supplying a gaseous substance through a permeable structure into the enclosed structure for a time period, where the time period is based on a temperature of the liquid in the enclosed structure. The permeable structure is disposed within the liquid contained by the enclosed structure. The permeable structure is connected to an inlet port of the enclosed structure via a pipe or a conduit, and the gaseous substance is provided through the inlet port. In an embodiment, the inlet port includes an air-moving device that forces the gaseous substance through the pipe up to the permeable structure. The permeable structure passes gaseous substance in the form of nano bubbles into the liquid. The nano bubbles react with the liquid to create an exothermic reaction that tends to raise the temperature of the liquid. Typically, the gaseous substance is an exothermic reactant comprising a gaseous form of carbon dioxide, hydrogen or oxygen or a combination thereof, and the liquid comprises one or more of an aqueous solution of alcohol, propylene glycol, ethylene glycol, and brine. For example when carbon dioxide gas is supplied in a bubble form into an aqueous solution of ethylene glycol, an exothermic reaction occurs which generates heat required to raise a temperature of the liquid.

Typically, the gaseous substance is supplied when a temperature of the liquid in the enclosed structure falls below the predefined temperature. In an embodiment, the temperature of the liquid is measured by at least one temperature probe positioned near the organic product. Further, the gaseous substance is supplied until the temperature of the liquid reaches the predefined temperature. The time period for passing the gaseous substance is calculated as a time taken by the liquid to reach the predefined temperature. The supply of the gaseous substance is ceased when the temperature of the liquid reaches the predefined temperature.

The method further includes agitating the liquid to break one or more layers of energy surrounding the organic product. Typically, as the organic product is at a lower temperature, than the temperature of the liquid, a temperature gradient exists throughout the liquid. In order to facilitate uniform thawing, it is essential, to reduce the temperature gradient. Hence, the agitating of the liquid is done by using at least one agitating device positioned within the enclosed structure.

In an embodiment, an agitating device is positioned within the enclosed structure and rotated at a predefined speed to agitate the liquid. For example, a helical agitator may be rotated inside the liquid at a predefined speed of 500 rotations per minute (rpm), to agitate the liquid. The predefined speed is selected based on a viscosity of the liquid. In an embodiment, the controller controls a speed of rotation of an agitator by communicating control signals wirelessly to the agitator. In another embodiment, the speed of rotation of the agitator is manually controlled.

The method further includes removing the organic product through the access means of the enclosed structure when a core temperature of the organic product reaches the predefined temperature. In an embodiment, prior to the removal of the organic product, a core temperature of a sample disposed within the liquid is measured with a temperature probe placed within the sample. As the sample is composed of same material as of the organic product, the core temperature of the sample corresponds to the core temperature of the organic product. When the core temperature of the sample reaches the predefined temperature, the circulation of the liquid, and the agitation of the liquid is ceased. Further, a control signal can be provided to an evacuating means that facilitates removal of the organic product from the enclosed structure. For example, if the organic product is placed within a meshed structure, the evacuating means can be a pulley arrangement used to lift the meshed structure that holds the organic product, out of the enclosed structure. In another example, the evacuating means can be a conveyor system that shifts the meshed structure in and out of the enclosed structure. The conveyor system can include a crane arrangement that holds the meshed structure via metallic chains and/or ropes, and a motor that facilitates movement of the crane in a manner that shifts the meshed structure through the enclosed structure.

Upon removing the organic product from the enclosed structure, the second layer of packing (e.g. the nylon bag) is removed from the organic product. Further, the organic product packed in the first layer of packing (the gas permeable bag) is placed in a waxed storage container (e.g. waxed cardboard boxes) for distribution to one or more consumers of the organic product, for immediate utilization. The organic product obtained upon tempering can be maintained at −2 degree Celsius, during the distribution for a shelf life of 4 to 7 days.

Another aspect of the invention provides an apparatus, for tempering an organic product. The apparatus includes an enclosed structure, a meshed arrangement, a first means, a second means, an agitator, a heating unit, a permeable structure, a controller, and at least one temperature probe. The enclosed structure is an insulated chamber that contains or holds a liquid used for tempering the organic product at a predefined temperature. The enclosed structure has at least one inlet and at least one outlet through which the liquid is circulated in and out of the enclosed structure respectively. The enclosed structure includes at least one access means through which the organic product is introduced inside the enclosed structure for purpose of tempering. In an embodiment, the at least one access means comprises a closeable opening provided at a top portion of the enclosed structure.

The meshed arrangement accommodates one or more samples of the organic product within the liquid. In an embodiment, the meshed arrangement can be introduced inside the enclosed structure through the at least one access means. In an embodiment, a controller moves the at least one access means into an open position when introducing the meshed arrangement into the enclosed structure and when removing the meshed arrangement from the enclosed structure. Further, the controller moves the at least one access means into a closed position when the meshed arrangement is placed inside the enclosed structure. The controller maintains the at least one access means in the closed position until a core temperature of the one or more samples reaches the predefined temperature.

The first means is operative to eject the liquid from an outlet of the enclosed structure through at least one liquid transmission means at a first flow rate. In an embodiment, the first means comprises a valve coupled to the outlet, and a pumping unit coupled to the at least one liquid transmission means. The pumping unit pumps liquid from the outlet to a reservoir. In an embodiment, the controller operates an opening of the valve to enable the liquid to flow out of the outlet, and a rate (the first flow rate) at which the pumping unit pumps the liquid. The reservoir is an insulated chamber to store the liquid transferred from the heating unit via the at least one liquid transmission means at the predefined temperature. The reservoir is maintained at the predefined temperature by a cooling unit (e.g. a plurality of condensers). Further, the reservoir provides the liquid to the inlet of the enclosed structure via at least one other liquid transmission means. The reservoir is connected between the heating unit and the inlet.

The second means is operative concurrently with the first means, to supply the liquid through an inlet into the enclosed structure at a second flow rate. In an embodiment, the second means pumps liquid from the reservoir to the inlet of the enclosed structure. In an embodiment, the second means comprises a valve coupled to the inlet and another pumping unit coupled to the at least one other liquid transmission means, where the other pumping unit pumps the liquid from the reservoir into the enclosed structure through the inlet. In an embodiment, the controller operates an opening of the valve of the inlet to enable the liquid to flow into the enclosed structure and controls a pumping rate (the second flow rate) of the other pumping unit.

The controller can operate the first means and the second means to maintain the liquid within the enclosed structure at a predetermined level such that the one or more samples of the organic product is completely immersed within the liquid. Alternatively, the controller adjusts, the first flow rate and the second flow rate based on the predetermined level and the temperature of the liquid. For example, the first and the second flow rate can be increased to bring the temperature of the liquid up to the predefined temperature within a short span of time (e.g. few seconds).

The heating unit increases a temperature of the liquid ejected from the outlet up to the predefined temperature, and transfers the liquid towards the inlet through the at least one other liquid transmission means. In an embodiment, the heating unit includes a temperature control unit that senses a temperature of the liquid ejected from the outlet and controls a supply of heat by the heating unit to the liquid, based on a difference between the temperature of the liquid ejected from the outlet and the predefined temperature.

The agitator is disposed within the enclosed structure and can be operated electromechanically to agitate the liquid and break layers of energy surrounding the organic product.

The permeable structure is provided inside the enclosed structure to pass a gaseous substance in a form of bubbles (e.g. nano bubbles) into the liquid contained in the enclosed structure. In an embodiment, the permeable structure is a gas permeable membrane or a sintered sparger. The gas permeable membrane includes plurality of pores on a surface through which one or more bubbles of the gaseous substance is generated. A diameter of each pore is in a range of 0.5 to 3 micron. In an embodiment, the gaseous substance can be any exothermic reactant that reacts with the liquid to create an exothermic reaction that generates heat to raise a temperature of the liquid. Examples of the gaseous substance include but are not limited to carbon dioxide gas, hydrogen and oxygen.

The gas permeable structure is connected to an inlet port of the enclosed structure that receives the gaseous substance from a gas reservoir connected to the inlet port via a pipe or a conduit. Further, an opening of the inlet port is operated based on a temperature of the liquid in the enclosed structure. In an embodiment, the controller opens the inlet port is and operates an air-moving device provided within the inlet port to force the gaseous substance through the permeable structure when the temperature of the liquid is less than the predefined temperature. Further, the controller closes the inlet port to cease supply of the gaseous substance when the temperature of the liquid reaches the predefined temperature.

The at least one temperature probe suspended within the liquid that measures the temperature of the liquid, and communicates the temperature to the controller. In an embodiment, the controller provides a control signal to a pulley arrangement to remove the meshed arrangement from the enclosed structure, when a core temperature of the one or more samples of the organic product reaches the predefined temperature. In an embodiment, the apparatus includes a sample product made of same material as the organic product suspended within the liquid with a temperature probe inside the sample. The temperature probe measures a core temperature of the same and communicates the core temperature to the controller. The controller provides a control signal to a pulley arrangement to remove the meshed arrangement from the enclosed structure, when the core temperature of the sample equals the predefined temperature, as the core temperature of the sample corresponds to the core temperature of the one or more samples of the organic product.

Accordingly, the tempering process is completed when the core temperature of the one or more samples of the organic product introduced into the enclosed structure reaches the predefined temperature (−2 degree Celsius). The tempered organic product is fit for immediate utilization (e.g. a tempered food product can be immediately cooked or consumed).

DETAILED DESCRIPTION OF THE INVENTION

The present invention is related to a method and apparatus for tempering of organic products at low temperatures in a relatively short span of time in comparison to prior art techniques. The organic products include but are not limited to seafood, meat, poultry, vegetables, fruits, roots, seeds, microbes, fungi, albumin, milk, proteins, gels, biological media, blood plasma and other biodegradable products. Disclosed apparatus is used for bringing frozen organic products (e.g. fish fillets available in a frozen state of −40 degree Celsius) to a fresh chill state (e.g. −2 degree Celsius) when the organic products need to be utilized (e.g. at a time of distributing or selling the fish fillets to a consumer). Various embodiments of the present invention can be practiced using an apparatus as shown in FIG. 1.

Figure 1:
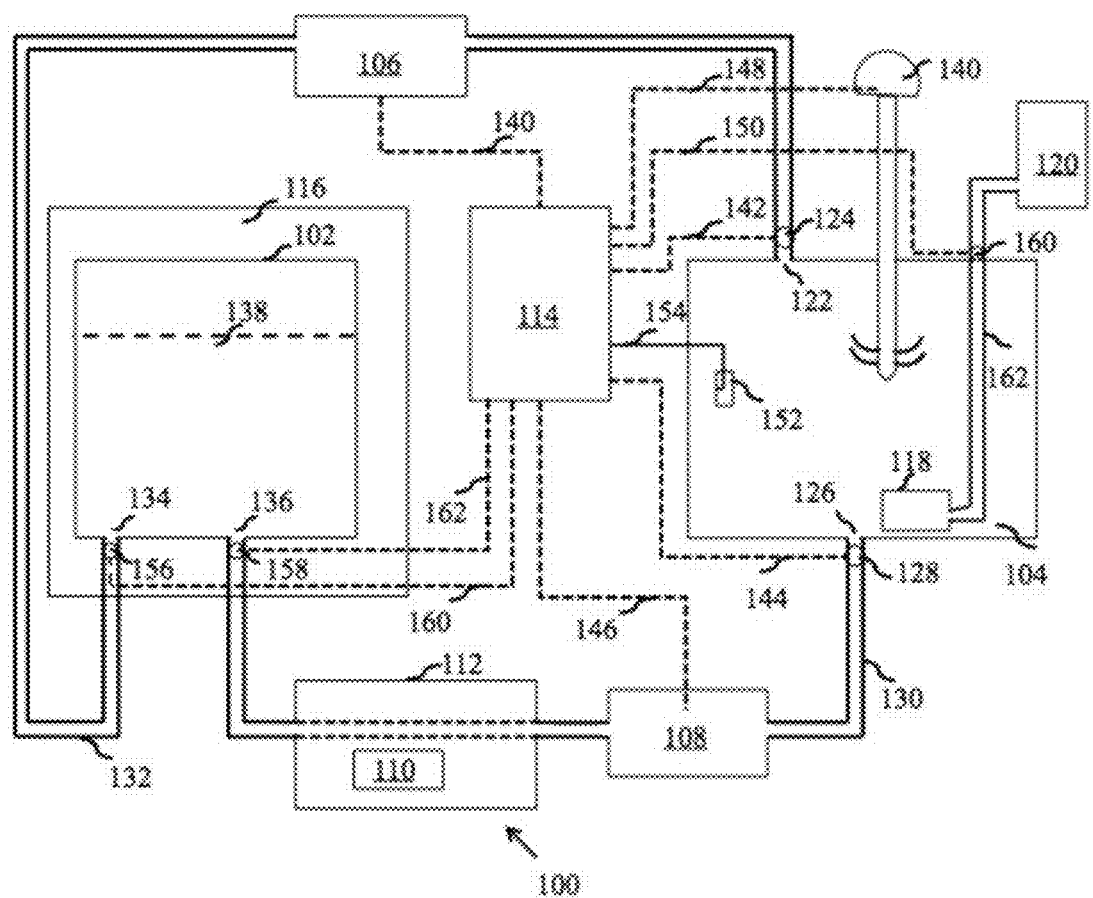
FIG. 1 is a block diagram of an apparatus for tempering organic products, in accordance with an embodiment of the present invention.

FIG. 1 is a block diagram illustrating various components of an apparatus 100 used for tempering organic products, in accordance with an embodiment of the present invention. As shown in FIG. 1, the apparatus includes a reservoir 102, a cooling unit 116, a pumping unit 106, at least one liquid transmission means 130, another pumping unit 108, at least one other liquid transmission means 132, an enclosed structure 104, a controller 114, a heating unit 112, a temperature control unit 110, a gas reservoir 120, a permeable structure 118, a temperature probe 152, and an agitator 140.

The reservoir is a closed container that stores a liquid required for the tempering process. The reservoir is surrounded with the cooling unit (e.g. cooling coils that circulate a refrigerant) to maintain the reservoir and hence the liquid at a predefined temperature (e.g. −5 to 0 degree Celsius). In an embodiment, the reservoir is cooled by condensers up to the predefined temperature. The reservoir provides a flow of liquid at the predefined temperature to the enclosed structure for the tempering process. Though the reservoir is shown to provide the liquid to one enclosed structure (e.g. 104) in FIG. 1, it is understood that the reservoir can provide the liquid to multiple such enclosed structures. Hence simultaneous tempering of multiple organic products in multiple enclosed structures can be done by the disclosed apparatus.

The enclosed structure is a closed container or a chamber that contains the liquid used for tempering an organic product (e.g. fish fillet). The liquid is maintained at the predefined temperature within the enclosed structure for the purpose of tempering. In an embodiment, the enclosed structure is insulated with foam material (e.g. polyurethane foam (PUF)), to help maintain the liquid at the predefined temperature. In an embodiment, the liquid is an aqueous solution of alcohol, propylene glycol, ethylene glycol, or brine. For example, the liquid is an aqueous solution of propylene glycol, where a ratio of propylene glycol to water is from 0.5:4 to 1.5:4.

The organic product is introduced inside the enclosed chamber through at least one access means (not shown in FIG. 1) of the enclosed structure. In an embodiment, the at least one access means comprises a closeable opening provided at a top portion of the enclosed structure. For example, the enclosed structure is a chamber having an access on a top surface that can be closed with a sealable lid. The controller 114 moves the at least one access means into an open position, when introducing the organic product (or a meshed arrangement 202a of FIG. 2 accommodating an organic product 214) into the enclosed structure, and when removing the organic product (or the meshed arrangement) from the enclosed structure. Further, the controller moves the at least one access means into a closed position when the organic product is placed inside the enclosed structure. For example, a lid can be slid open by the controller for introducing the organic product into the enclosed structure, and can be closed thereupon.

Figure 2:
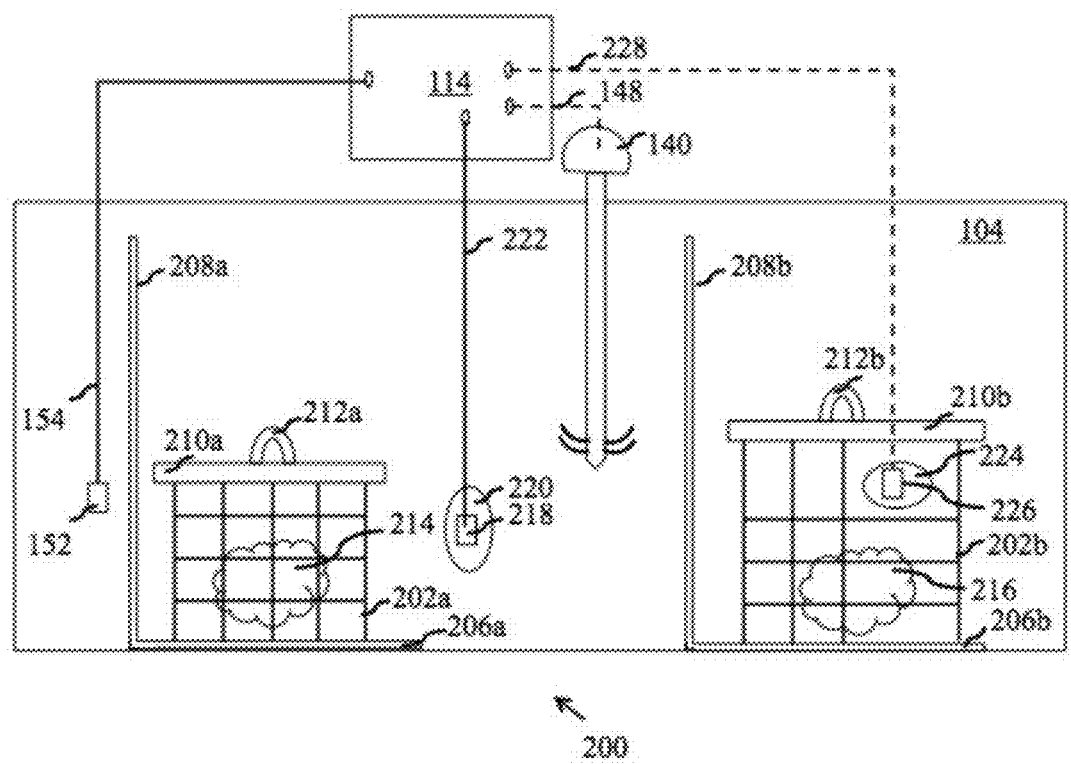
FIG. 2 is a block diagram of an enclosed structure depicting at least one mesh arrangement accommodating organic products to be tempered with the apparatus referred to in FIG. 1, in accordance with an embodiment of the present invention.

In an embodiment, the meshed arrangement (e.g. 202a as shown in FIG. 2), that accommodates the organic product (214), is introduced inside the enclosed structure through the at least one access means. FIG. 2 is a block diagram of an enclosed structure depicting at least one mesh arrangement accommodating organic products to be tempered with the apparatus referred to in FIG. 1, in accordance with an embodiment of the present invention. Though FIG. 2 depicts two meshed arrangements 202a and 202b within the enclosed structure accommodating organic products 214 and 216 respectively, it is understood, that multiple such meshed arrangements accommodating multiple organic products can be introduced inside the enclosed structure depending on a size of the enclosed structure. As shown, the meshed arrangement 202a is placed on a supporting structure such as a base rod 206a, and the meshed arrangement 202b is placed on a base rod 206b. The base rods 206a and 206b are supported by supporting columns 208a and 208b respectively. The meshed arrangement 202a can be lifted via the handle 212a provided on a lifting bar 210a attached to a top portion of the meshed arrangement. Similarly, the meshed arrangement 202b can be lifted by the handle 212b provided on a lifting bar 210b. A perspective view of the meshed arrangement 202a is shown in FIG. 3.

Figure 3:
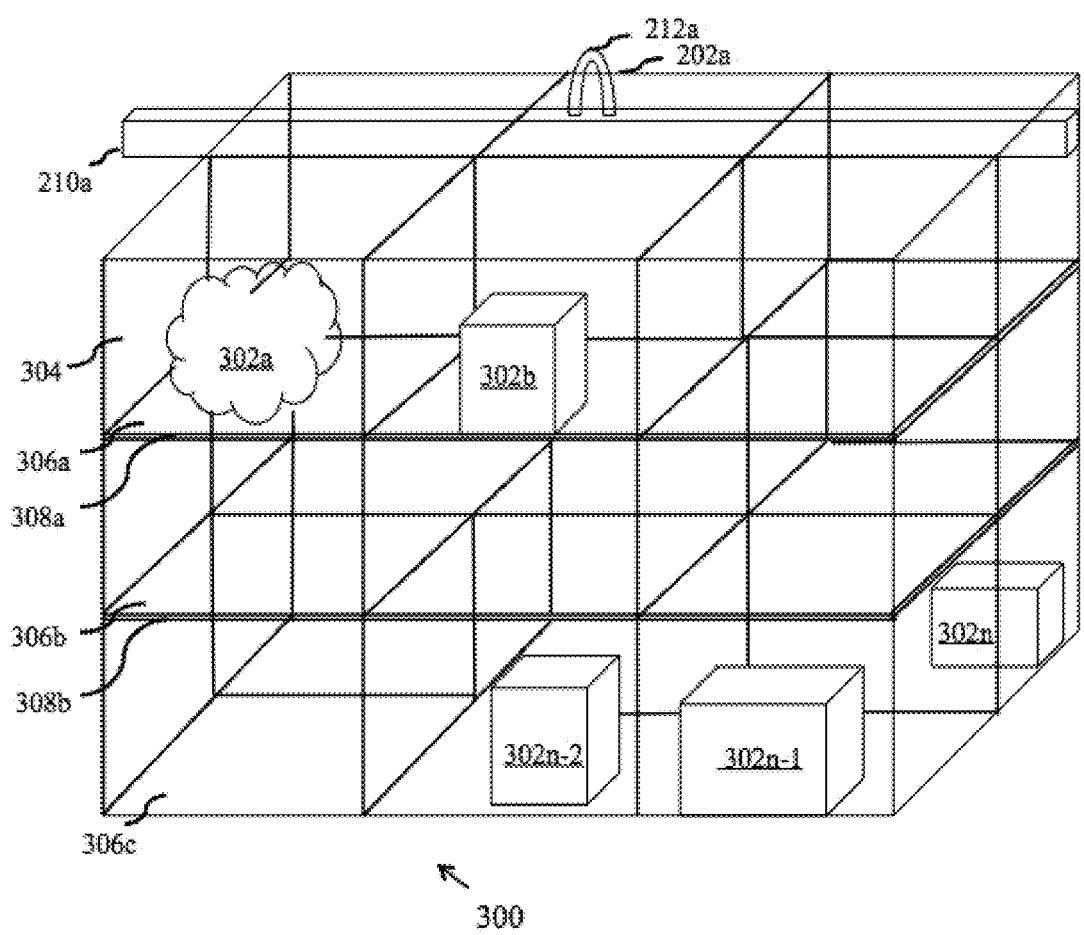
FIG. 3 is an isometric view of a meshed arrangement disposed within the enclosed structure referred to in FIG. 2, in accordance with an embodiment of the present invention.

FIG. 3 is a perspective view 300 of the meshed arrangement 202a including a plurality of shelves 306a-c as shown. A thick base supports each shelf, for example, shelf 306a is supported by 308a. Further, each shelf is further divided into a plurality of cells. For example, shelf 306a is divided into cells 304a-c by vertical columns, so that each cell accommodates one sample of the organic product. Generally, the each cell is barbed or meshed with wires as shown in FIG. 4.

Figure 4:
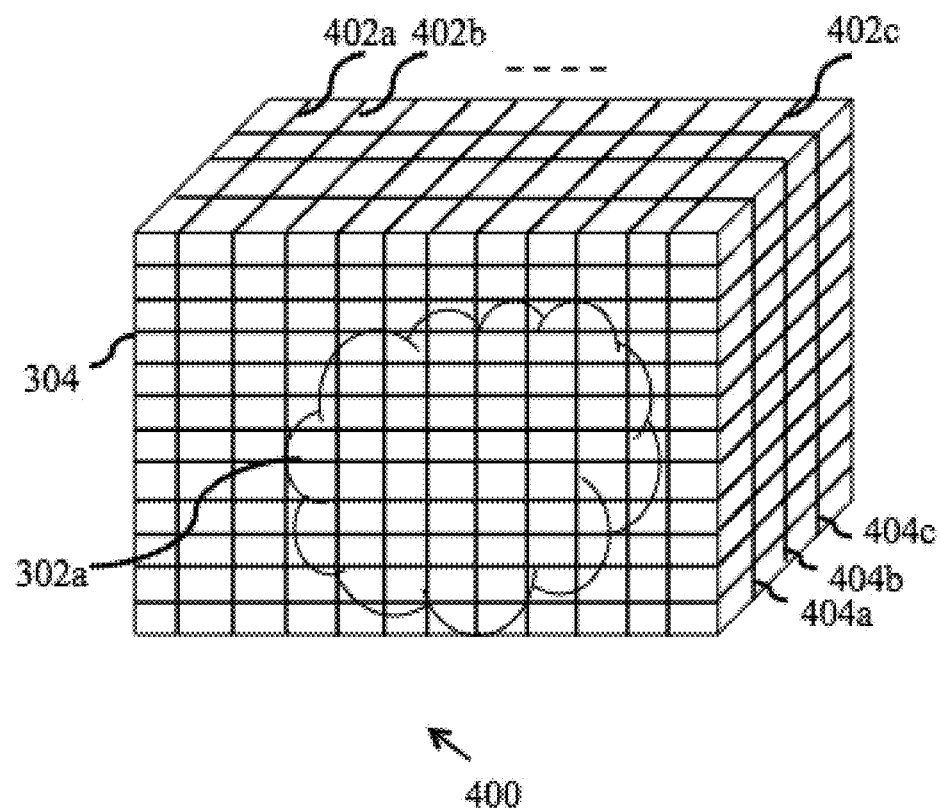
FIG. 4 an isometric view of a cell of the meshed arrangement of FIG. 3, in accordance with an embodiment of the present invention.

FIG. 4 an isometric view 400 of the cell 304a of the meshed arrangement 202a, in accordance with an embodiment of the present invention. The cell 304a is meshed with a plurality of wires 402a-n and 404a-n. The sample 302a of the organic product is placed within the space enclosed by the plurality of wires as shown. Due to the plurality of wires, the liquid in the enclosed structure can flow through the cell 304a and surround the sample 302a, thereby effecting tempering of the sample 302a.

Referring to FIG. 3, the meshed arrangement 202a includes the lifting bar 210a, which is attached to a top portion of the meshed arrangement 202a. In an embodiment, the lifting bar is welded to a plurality of wires of the meshed arrangement provided on the top portion. In an embodiment, a pulley arrangement latches onto the handle 212a to carry/lower the meshed arrangement into the enclosed chamber. Accordingly the pulley arrangement is used to lift the meshed arrangement through the at least one access means out of the enclosed structure when the tempering of the organic product is complete. The tempering of the organic product is complete, when a core temperature of the organic product reaches the predefined temperature.

In an embodiment, as shown in FIG. 2, a sample 224 made of a similar material as the organic product is provided on a shelf of the meshed arrangement 202b. The sample 224 includes a temperature probe 226 disposed or stuffed inside the sample. The temperature probe can measure a core temperature of the sample 224, and communicate the core temperature via a communication link 228 to the controller. As the sample 224 is made of the same material as the organic product, the core temperature of the sample 224 corresponds to the core temperature of the organic product (e.g. 214 and 216). Thus when the core temperature of the sample 224 reaches the predefined temperature, the controller provides a control signal to the at least one access means to move to an open position and to the pulley arrangement to lift the meshed arrangement 206a and 206b out of the enclosed structure. In another embodiment, a temperature probe 218 disposed inside another sample 220 made of the same material as the organic product is provided. The temperature probe 218 is connected by a wired link 122 to the controller, through which a core temperature of the sample 220 is communicated to the controller. Either the temperature probe 218 or the temperature probe 226 or both can be provided within the enclosed structure to determine the core temperature of the organic product (e.g. 214 and 216) during the tempering process.

When the organic product is immersed into the liquid of the enclosed structure, a temperature of the liquid tends to fall as a temperature of the organic product is generally lower than the predefined temperature. For example, the temperature of the organic product is in a range of −100 to −30 degree Celsius, and the temperature of the liquid is in a range of the −5 to 0 degree Celsius.

The temperature probe 152 suspended within the liquid measures the temperature of the liquid and communicates the temperature to the controller via a communication link 154. The communication link can be a wired or a wireless communication link. In an embodiment, the temperature probe is a wireless temperature sensor that can communicate with the controller over a wireless communication link. In such embodiment, the temperature probe can be placed on a rack within the meshed arrangement to measure the temperature of surrounding liquid.

To thaw or temper the organic product it is essential to maintain the liquid at the predefined temperature. In order to maintain the temperature of the liquid, the liquid is circulated from the enclosed structure through the heating unit to the reservoir, and from the reservoir back into the enclosed structure. The heating unit supplies heat to the liquid ejected from the enclosed structure to increase the temperature of the liquid ejected up to the predefined temperature, the reservoir stores the liquid received from the heating unit at the predefined temperature, and the other pumping unit pumps the liquid from the reservoir to the enclosed structure.

In order to circulate the liquid, the liquid is ejected at a first flow rate from at least one outlet of the enclosed structure into the reservoir, and liquid from the reservoir is pumped at a second flow rate to at least one inlet of the enclosed structure. In an embodiment, a first means is operative to eject the liquid from an outlet (126) of the enclosed structure through a liquid transmission means at the first flow rate. In the embodiment, the first means comprises a valve (128) coupled to the outlet (126), and a pumping unit (108) coupled to the at least one liquid transmission means (132) (e.g. a metal conduit or a steel pipe). The pumping unit pumps liquid at the first flow rate from the outlet to the reservoir via the at least one liquid transmission means. In an embodiment, the pumping unit 108 is an electromechanical pump controlled by the controller via a communication link 146. For example, the controller may provide a control signal over a wireless communication link (e.g. Bluetooth™) to operate the other pumping unit to pump the liquid at the second flow rate. Further, the controller may provide a control signal via a communication link 144 to operate the valve 124 into an open position for facilitating flow of the liquid through the inlet into the enclosed structure. Further, the liquid is pumped into the reservoir through an inlet 136 of the reservoir. In an embodiment, the inlet 134 can include a valve 158 (e.g. an electromechanical valve) operated by the controller via a communication link 162, as shown in FIG. 1. Alternatively, the valve 156 can be a manually operated valve.

Further, a second means operative concurrently with the first means, supplies the liquid through an inlet (122) into the enclosed structure at the second flow rate. The second means comprises a valve (124) coupled to the inlet (122) and another pumping unit (106) coupled to the at least one other liquid transmission means (132). The valve 124 can be a mechanical valve or an electrical valve operated by the controller via a communication link 142 as shown in FIG. 1. The other pumping unit pumps liquid at the second flow rate from an outlet 134 of the reservoir to the inlet through the at least one other liquid transmission means. In an embodiment, the other pumping unit 106 is an electromechanical pump controlled by the controller via a communication link 140. For example, the controller may provide a control signal over a wireless communication link (e.g. Bluetooth™) to operate the other pumping unit to pump the liquid at the second flow rate. Further, the controller may provide a control signal to operate the valve 124 into an open position for facilitating flow of the liquid through the inlet into the enclosed structure. Similarly, in an embodiment, the outlet 134 can include a valve 156 (e.g. an electromechanical valve) operated by the controller via a communication link 160, as shown in FIG. 1. Alternatively, the valve 156 can be a manually operated valve.

In the embodiment, as shown, the outlet 126 is provided at a bottom portion of the enclosed structure and the inlet 122 is provided at a top portion of the enclosed structure. In another embodiment, the outlet can be provided at a top portion of the enclosed structure and the inlet at the bottom portion. In another embodiment, the inlet and the outlet can be provided on one or more sidewalls of the enclosed structure.

The controller adjusts the first flow rate and the second flow rate such that the liquid is maintained at a predetermined level within the enclosed structure. Further, the controller can modify the first flow rate and the second flow rate based on the temperature of the liquid. For example, if the temperature of the liquid falls to a very low temperature during the tempering process, the controller may increase the first flow rate and the second flow rate, so that the circulation of the liquid through the heating unit is faster, and a larger quantity of the liquid can be heated, to raise the temperature of the liquid in the enclosed structure to the predefined temperature in a short span of time.

The heating unit 112 is an apparatus comprising of a heating coil that can heat the liquid passing through it. The heating unit includes the temperature control unit 110 (e.g. a thermostat) that senses a temperature of the liquid passing through the heating unit, and controls a supply of heat to the liquid, based on a difference between the temperature of the liquid and the predefined temperature. In an embodiment, a thermostat is coupled within the heating unit, to control a measure of the heat supply to be provided for heating the liquid at any instant of time. In an embodiment, the heating unit transfers the liquid towards the second means through the at least one other liquid transmission means. In another embodiment, the heating unit transfers the liquid to an inlet 136 of the reservoir. The inlet includes a valve 158 that is controlled by the controller via a communication link 162. For example, the controller opens the valve 158, when the liquid needs to be pumped into the reservoir through the inlet.

Further, in order to facilitate raising of the temperature of the liquid, carbon dioxide gas is passed into the enclosed structure from a gas reservoir 120. The gas reservoir 120 provides a gaseous substance (for example, carbon dioxide, hydrogen or oxygen) through an inlet port 160 of the enclosed structure to the permeable structure placed inside the enclosed structure. In an embodiment, a pipe 162 connected between the inlet port and the permeable structure carries the gaseous substance to the permeable structure. The permeable structure includes a gas permeable membrane, a sintered sparger or any other type of sparger. In an embodiment, multiple sintered spargers are connected in series and arranged at a bottom of the enclosed structure, to pass the gaseous substance across a length of the enclosed structure. A perspective view of an example, gas permeable structure is shown in FIG. 5A.

Figure 5A:
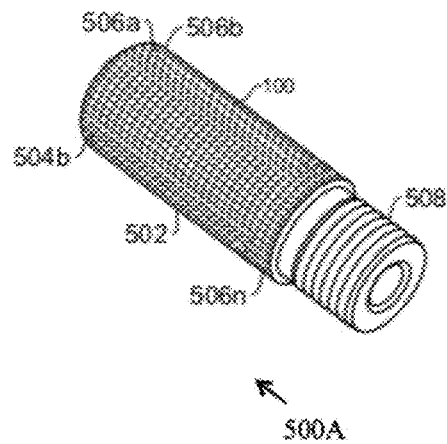
FIG. 5A is a perspective view of a permeable structure used within the apparatus referred to in FIG. 1, in accordance with an embodiment of the present invention.

FIG. 5A is a perspective view 500A of a permeable structure 502, in accordance with an embodiment of the present invention. The permeable structure includes a sintered surfaces 504a-b, that has multiple pores 506a-n having a diameter of 0.05 to 3 micron, through which nano bubbles of the gaseous substance is passed. A bottom portion of the sintered surface 504b is moulded to a threaded base 508. A front view of the permeable structure is shown in FIG. 5B.

Figure 5B:
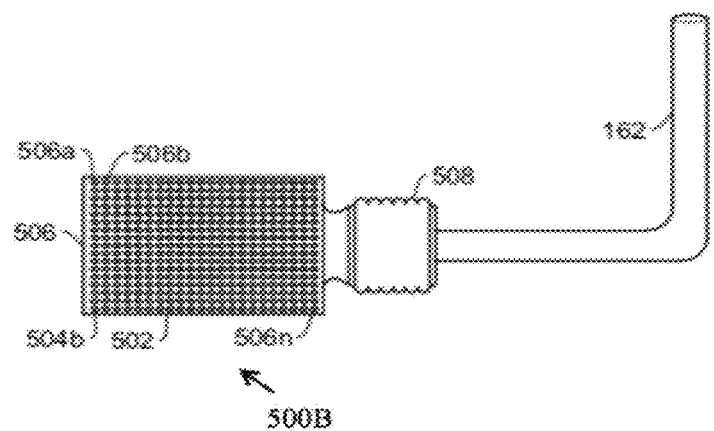
FIG. 5B is a front view of the permeable structure shown in FIG. 5A coupled to a pipe, in accordance with an embodiment of the present invention.

FIG. 5B illustrates a front view 500B of the permeable structure 502, connected to a pipe (e.g. 162 of FIG. 1), according to an embodiment of the present invention. As shown, the pipe is coupled by rotating it into the threaded base 508. The pipe provides a supply of the gaseous substance to the base of the permeable structure. Upon receiving the gaseous substance, the permeable structure passes the gaseous substance in the form of nano bubbles through sintered surfaces 504a-b. The nano bubbles of the gaseous substance are passed to an external environment (e.g. the liquid). The nano bubbles facilitate uniform distribution of the gaseous substance, for causing an exothermic reaction throughout the liquid thereby facilitating uniform increase in the temperature of the liquid.

An opening of the inlet port 160 is based on the temperature of the liquid in the enclosed structure. In an embodiment, the inlet port is opened and a supply of the gaseous substance is initiated when the temperature of the liquid in the enclosed structure falls below the predefined temperature. Reaction of the carbon the gaseous substance and the liquid results in an exothermic reaction that increases the temperature of the liquid. In an embodiment, the inlet port includes an air-moving device (a fan) that forces the gaseous substance (through the pipe 162) into the enclosed structure. Control signals provided by the controller via a communication link 150, operate the opening of the inlet port and the air-moving device to force supply of the gaseous substance to the gas permeable structure.

Further, the controller may operate the inlet port into a closed position to cease the supply of the gaseous substance into the enclosed structure when a temperature of the liquid in the enclosed structure reaches the predefined temperature. Accordingly, the bubbles of the gaseous substance are stopped within the liquid, and the process of tempering is continued without the gaseous substance, until the temperature of the liquid drops again below the predefined temperature. Further, the liquid needs to be agitated to break one or more layers of energy surrounding the organic product. Typically, as the organic product is at a lower temperature, than the temperature of the liquid, a temperature gradient exists throughout the liquid. In order to facilitate uniform tempering, it is essential, to reduce the temperature gradient.

In an embodiment, at least one agitating device is positioned within the enclosed structure and rotated at a predefined speed to agitate the liquid. For example, a helical agitator may be rotated inside the liquid at a predefined speed of 250 rotations per minute (rpm), to agitate the liquid. In an embodiment, the controller controls a speed of rotation of an agitator by communicating control signals wirelessly to the agitator. In another embodiment, the speed of rotation of the agitator is manually controlled. The speed of rotation is based on a viscosity of the liquid medium used for tempering. For example, the predefined speed can range between 1 to 500 rotations per minute (rpm).

As shown in FIG. 1, the agitator 140 is disposed inside the enclosed structure and operated electromechanically to agitate the liquid. The controller controls a speed of rotation of the agitator by communicating control signals to the agitator via a communication link 148. The agitator is selected from a group consisting of a screw-type, a fan type, a helical agitator and other suitable agitators existing in art. An isometric view of an example helical type agitator is shown in FIG. 6.

Figure 6:
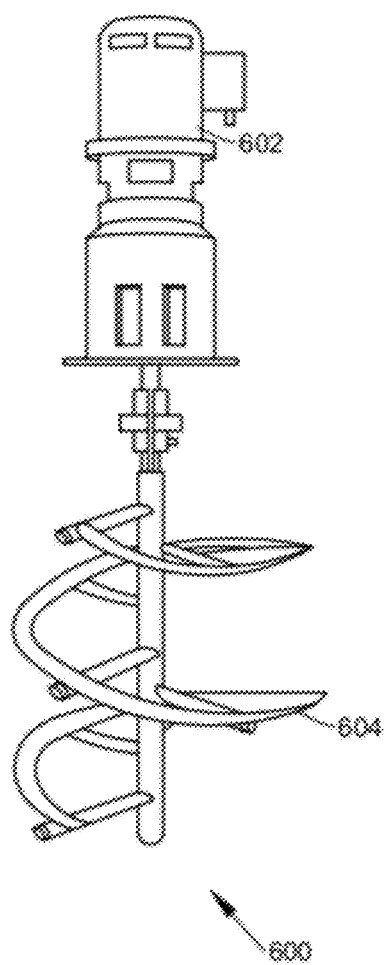
FIG. 6 is an isometric view of an agitator used within the apparatus referred to in FIG. 1, in accordance with an embodiment of the present invention.

FIG. 6 is an isometric view 600 of a helical agitator used within the apparatus referred to in FIG. 1, in accordance with an embodiment of the present invention. As shown, the helical agitator includes a helical blade 604 and a head comprising a motor 602. The motor operates the helical blade 604 to rotate at a predefined speed. A method for tempering an organic product using the apparatus 100 is explained further in reference to FIG. 7.

Figure 7:
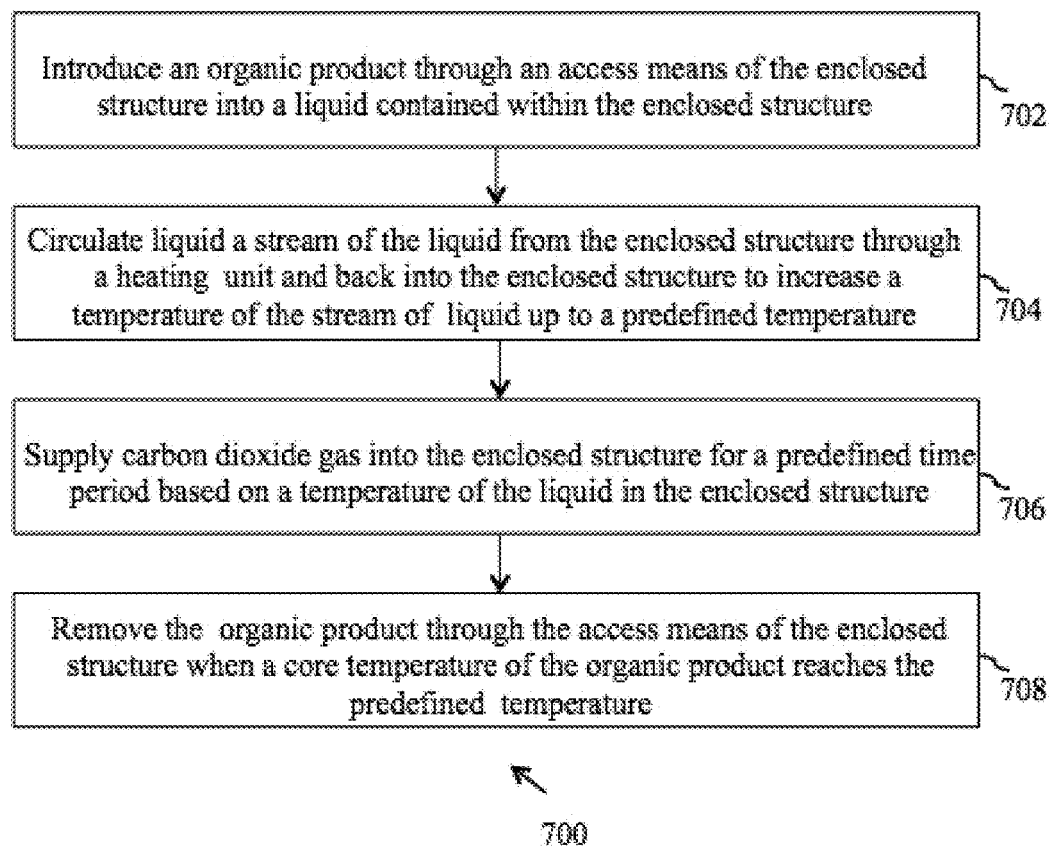
FIG. 7 is a flowchart of a method for tempering organic product(s), in accordance with an embodiment of the present invention.

FIG. 7 is a flowchart 700 illustrating a method for tempering an organic product in an enclosed structure at a predefined temperature. The enclosed structure contains or stores a liquid used for tempering the organic product. The liquid can be an aqueous solution of alcohol, propylene glycol, ethylene glycol, or brine. In an embodiment, the liquid is an aqueous solution of propylene glycol, wherein a weight ratio of propylene glycol to water ranges from 0.5:4 to 1.5:4. The organic product includes one or more of seafood, meat, poultry, vegetables, fruits, roots, seeds, microbes, fungi, albumin, milk, proteins, gels, biological media and blood plasma.

At 702, the organic product is introduced into the liquid contained within the enclosed structure through an access means of the enclosed structure. The access means is opened during the introduction of the organic product and is closed thereupon. In an embodiment, the organic product is placed in a meshed arrangement, and the meshed arrangement is lowered through the access means into the liquid.

At 704, the liquid is circulated from the enclosed structure through a heating unit and back into the enclosed structure to increase a temperature of the liquid up to a predefined temperature. The heating unit supplies heat to the liquid to increase the temperature up to the predefined temperature. In an embodiment, the liquid is pumped at a first flow rate from at least one outlet of the enclosed structure through at least one liquid transmission means into a reservoir via the heating unit. Within the heating unit, a temperature control unit controls the supply of heat to the liquid passing through the heating unit to raise a temperature of the liquid to the predefined temperature. Accordingly, the heat supplied is based on a difference between a temperature of the liquid and the predefined temperature. The liquid in the reservoir is maintained at the predefined temperature by a cooling unit. Further, liquid from the reservoir is pumped to at least one inlet of the enclosed structure through at least one other liquid transmission means.

At 706, a gaseous substance is supplied into the enclosed structure for a predefined time period. The predefined time period is based on a temperature of the liquid in the enclosed structure. In an embodiment, a supply the gaseous substance is initiated through an inlet port of the enclosed structure, when a temperature of the liquid in the enclosed structure falls below the predefined temperature. An air-moving device positioned in the inlet port forces the gaseous substance into the enclosed structure. In an embodiment, the inlet port is connected by a pipe to a permeable structure placed inside the enclosed structure. The permeable structure passes the gaseous substance received in a form of bubbles into the liquid. The bubbles create an exothermic generation in the liquid that raises a temperature of the liquid uniformly. In an embodiment, the permeable structure is a gas permeable structure such as a bubble generator that generates bubbles of diameter 0.1 to 3 micron. The supply of gaseous substance into the enclosed structure is ceased when a temperature of the liquid in the enclosed structure reaches the predefined temperature. For example, the gaseous substance is an exothermic reactant comprising one or more of carbon dioxide gas, hydrogen and oxygen.

At 708, the organic product is removed through the access means of the enclosed structure, when a core temperature of the organic product reaches the predefined temperature. In an embodiment, a sample composed of same material as of the organic product is disposed within the liquid, and a temperature probe is placed inside the sample. A core temperature of the sample is measured by the temperature probe and provided to a controller. Typically, the core temperature of the sample, corresponds to a core temperature of the organic product. Hence, when the core temperature of the sample reaches the predefined temperature, the core temperature of the organic product is also at the predefined temperature indicating a completion of tempering of the organic product. Accordingly, a circulation of the liquid, and agitation of the liquid is ceased when the measured core temperature of the sample reaches the predefined temperature. Further, a control signal is provided to an evacuating means (for example a pulley arrangement) removing the meshed arrangement from the enclosed structure. In an embodiment, the evacuating means is a pulley arrangement that connects to the meshed arrangement.

There can be two modes of performing the method described in FIG. 7. One embodiment includes a batch process where organic products are tempered in small quantities or batches. The batch process is usually done for smaller quantity of organic product such as in restaurants. Another embodiment includes the continuous process that is employed for larger quantity of the organic products. This is used in food processing factories or food banks. An example of the batch process of thawing for tempering organic products is explained in reference to the flowchart of FIG. 8.

Figure 8:
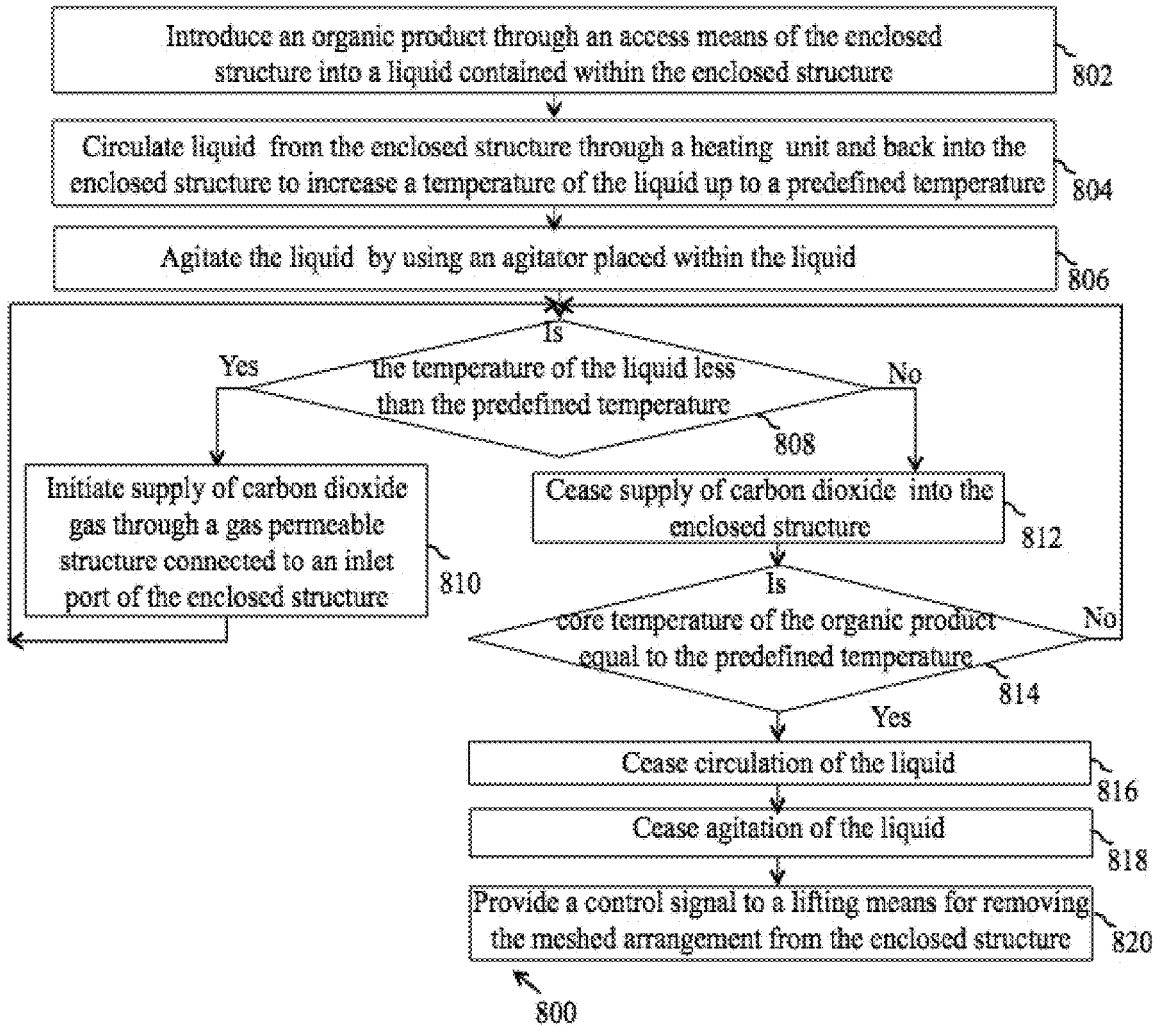
FIG. 8 is a flowchart of a method for tempering organic product(s), in accordance with another embodiment of the present invention.

FIG. 8 is a flowchart 800 depicting a method for tempering an organic product, at a predefined temperature, according to an embodiment of the present invention. The organic product is tempered in a liquid medium contained within an enclosed structure. In an embodiment, the organic product is vacuum-sealed in a gas permeable bag first and is then double sealed with a high barrier bag. In an example, the gas permeable bag is a 10K Oxygen Transmission Rate (OTR) bag, and the high barrier bag is a non-permeable bag (e.g. a nylon bag). The liquid medium is one of an aqueous solution of alcohol, propylene glycol, ethylene glycol, and brine.

At 802, the organic product is introduced into the liquid through an access means of the enclosed structure. In an embodiment, the organic product is double sealed with a gas permeable bag and a high barrier bag.

At 804, the liquid is circulated from the enclosed structure through a heating unit and back into the enclosed structure to increase a temperature of the liquid up to a predefined temperature.

At 806, an agitator is positioned within the liquid, to facilitate a process of tempering the organic product.

At 808, if a temperature of the liquid is determined to be less than the predefined temperature, the method flows to step 810, and if the temperature of the liquid has reached the predefined temperature, the method flows to step 812.

At 810, a supply of gaseous substance in a form of bubbles in the liquid is initiated through a permeable structure connected to the inlet port. The supply of the gaseous substance creates an exothermic reaction in the liquid that generates heat. The heat so generated helps in raising the temperature of the liquid. For example, the gaseous substance is an exothermic reactant comprising one or more of carbon dioxide gas, hydrogen and oxygen.

At 812, the supply of the gaseous substance is ceased, as the temperature of the liquid need not be raised further.

At 814, a core temperature of the organic product is compared against the predefined temperature. In case the core temperature has reached the predefined temperature, the method flows to step 816, else the method flows to step 808.

At 816, circulation of the liquid is ceased, as the tempering process is complete.

At 818, agitation of the liquid is ceased, as the tempering process is complete. organic product obtained after the tempering process, can be picked up from the meshed arrangement using a sterilized apparatus. Alternatively, sterilized gloves may be used to picked the organic product manually. The outer nylon bag is cut open and discarded. The organic product sealed in the gas permeable bag is then placed in waxed storage containers (e.g. waxed cardboard boxes), and is dispatched for delivery/shipped to one or more consumers. The organic product once thawed or tempered can be utilized immediately or stored at chilled temperatures (−2 to 0 degree Celsius) up to a period of 4 to 7 days.

At 820, the controller provides a control signal to a lifting means for raising/removing the meshed arrangement from the enclosed structure. In an embodiment, the organic product obtained after the tempering process, can be picked up from the meshed arrangement using a sterilized apparatus. Alternatively, sterilized gloves may be used to picked the organic product manually. The outer nylon bag is cut open and discarded. The organic product sealed in the gas permeable bag is then placed in waxed storage containers (e.g. waxed cardboard boxes), and is dispatched for delivery/shipped to one or more consumers. The organic product once thawed or tempered can be utilized immediately or stored at chilled temperatures (−2 to 0 degree Celsius) longer period of time in comparison to existing tempered products. For example, seafood when tempered by disclosed method can be stored from −2 to 0 degree Celsius for 4 to 7 days.

Aforesaid illustrations, describe an effective means of tempering organic products using a liquid medium maintained at −5 to 0 degree Celsius. Use of liquid medium helps in uniform tempering of the organic products. As the temperature is maintained at −5 to 0 degree Celsius at all times during the tempering process, growth of bacteria and any pathogens within the organic products being thawed/tempered is completely eliminated.

Further, tempering at −2 degree Celsius results in an optimum firmness and texture of the organic products such as fish and meat products, that makes utilization of the products convenient. For example, where the organic product is meat or a fish fillet, such firmness facilitates easy cutting, slicing and shredding of the meat/fish. Further, use of carbon dioxide and maintaining optimum temperature levels during the tempering process makes the process overall time efficient. For example, a time taken for tempering 25 kgs of salmon fish from −40 degree Celsius to −2 degree Celsius is 20 minutes, which is relatively lesser than prior art techniques. As a result, of the short span of time (e.g. 20 minutes) taken for tempering the growth of pathogens and/or microbes within the organic product (e.g. salmon fish) during the tempering process is eliminated, thereby retaining quality and freshness of the organic product. Disclosed methods and processes help retain the physiological, chemical, biological and structural properties of the organic products prior and post the tempering process. Further the short time of tempering can help in meeting an immediate demand for the organic product.

Further, vacuum sealing the organic product in the gas permeable bag and the high barrier bag prior to the tempering process, prevents the liquid to get in touch with the organic product during the tempering. Further, use of vacuum sealing and the high barrier bag prevents growth of aerobic bacteria within the organic product. As a result, anaerobic and aerobic spoilage of the organic product during the tempering process and post the tempering process is completely eliminated.

Further, post the tempering process, the high barrier bag is cut open/removed, and the organic product packed in the gas permeable bag shipped/distributed in cardboard boxes maintained at −2 degree Celsius. Use of the gas permeable bag during the distribution ensures that toxins are not formed due to anaerobic bacteria. For example, anaerobic bacterial *Clostridium botulinum* produces a highly toxic neurotoxin at high temperatures in absence of oxygen. The low temperatures maintained during the distribution and the use of gas permeable bags, prevents such anaerobic bacteria from producing toxins within the organic products that are out for distribution. As a result, toxin free and refreshable organic products are obtained by the tempering process disclosed in the present invention.

What is claimed is:

1. A method of tempering an organic product in an enclosed structure, wherein the
  enclosed structure contains a liquid used for tempering the organic product, the method comprising:
  introducing the organic product through an access means of the enclosed structure into the liquid;
  maintaining the liquid at a predefined temperature by:
    circulating the liquid from the enclosed structure through a heating unit and back into the enclosed structure to increase a temperature of the liquid up to a predefined temperature, wherein the heating unit heats the liquid to increase the temperature up to the predefined temperature; and
    supplying a gaseous substance into the liquid for a time period, wherein the time period is based on a temperature of the liquid in the enclosed structure; and
    removing the organic product through the access means of the enclosed structure when a core temperature of the organic product reaches the predefined temperature.

2. The method of claim 1, wherein the gaseous substance is an exothermic reactant comprising one or more of carbon dioxide gas, hydrogen and oxygen.

3. The method of claim 1, wherein the organic product is vacuum-sealed in a gas permeable bag, and a barrier bag, wherein the gas permeable bag is a first layer of packing on the organic product, and the barrier bag is a second layer of packing covering the gas permeable bag.

4. The method of claim 1, wherein circulating the liquid further comprises:
  pumping the liquid at a first flow rate from at least one outlet of the enclosed structure through at least one liquid transmission means into a reservoir via the heating unit, wherein the reservoir is maintained at the predefined temperature by a cooling unit;
  controlling by a temperature control unit a heat supply to the liquid passing through the heating unit, based on a difference between a temperature of the liquid and the predefined temperature, wherein the temperature control unit is coupled to the heating unit; and
  pumping liquid from the reservoir to at least one inlet of the enclosed structure through at least one other liquid transmission means, wherein the first flow rate and the second flow rate are adjusted to maintain a predetermined level of the liquid in the enclosed structure.

5. The method of claim 1, wherein supplying the gaseous substance further comprises:
   initiating supply of the gaseous substance through a gas permeable structure connected to an inlet port of the enclosed structure when a temperature of the liquid in the enclosed structure falls below the predefined temperature, wherein an air-moving device positioned in the inlet port forces the at least one gaseous substance into the enclosed structure; and
   ceasing the supply the at least one gaseous substance into the enclosed structure when a temperature of the liquid in the enclosed structure reaches the predefined temperature.

6. The method of claim 1, wherein maintaining the liquid at the predefined temperature further comprises:
   agitating the liquid using at least one agitating device positioned within the liquid in the enclosed structure.

7. The method of claim 1, wherein removing the organic product further comprises:
   measuring a core temperature of a sample with a temperature probe placed within the sample, wherein the sample is composed of same material as of the organic product, wherein the sample is disposed within the liquid, and wherein the core temperature of the sample corresponds to the core temperature of the organic product;
   ceasing circulation of the liquid, and agitation of the liquid when the core temperature of the sample reaches the predefined temperature; and
   providing a control signal to an evacuating means that facilitates removal of the organic product from the enclosed structure.

8. The method of claim 1, wherein the liquid comprises one or more of an aqueous solution of alcohol, propylene glycol, ethylene glycol, and brine.

9. The method of claim 1, wherein the liquid is an aqueous solution of propylene glycol, and wherein a weight ratio of propylene glycol to water ranges from 0.5:4 to 1.5:4.

10. The method of claim 1, wherein a temperature of the organic product is lower than the predefined temperature of the liquid, wherein the temperature of the organic product is in a range of −100 to −30 degree Celsius, and wherein the predefined temperature is in a range of −5 to 0 degree Celsius.

11. The method of claim 1, wherein the organic product is one or more of seafood, meat, poultry, vegetables, fruits, roots, seeds, microbes, fungi, albumin, milk, proteins, gels, and blood plasma.

* * * * *